Feb. 25, 1941.  G. A. MATTHEWS  2,232,715

CONDUCTIVITY TESTING APPARATUS

Filed Feb. 14, 1940  2 Sheets-Sheet 1

Inventor:
George A. Matthews,
By Potter, Pierce, Scheffler
Attorneys.

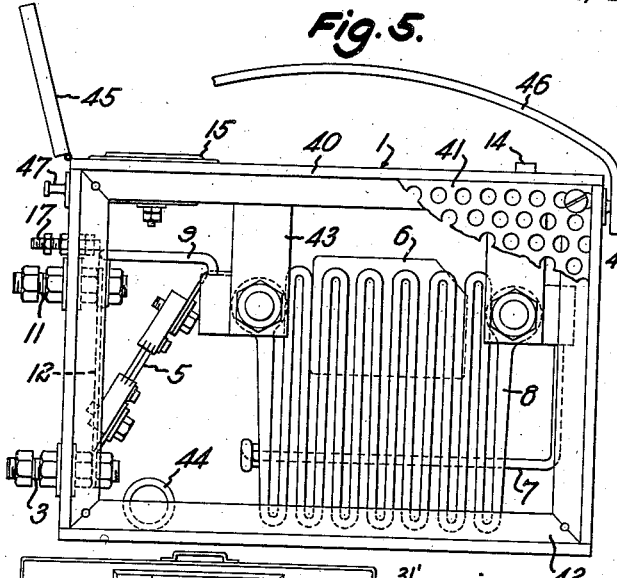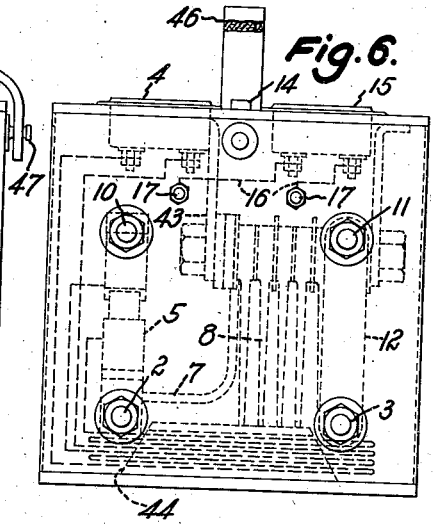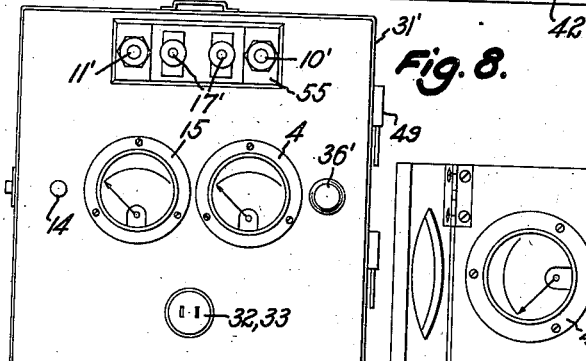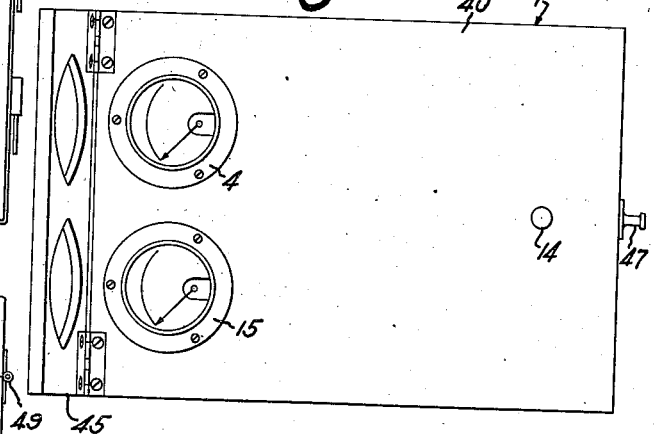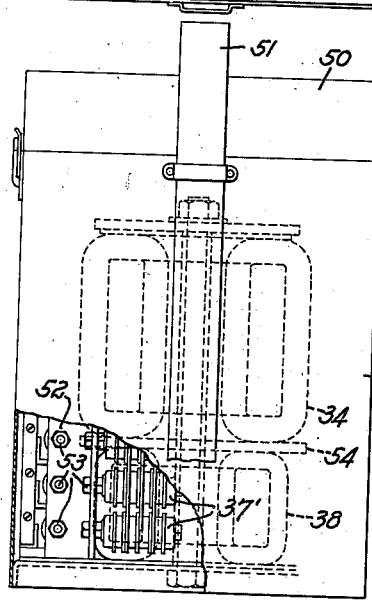

Patented Feb. 25, 1941

2,232,715

UNITED STATES PATENT OFFICE 2,232,715

CONDUCTIVITY TESTING APPARATUS

George A. Matthews, Detroit, Mich.

Application February 14, 1940, Serial No. 318,925

9 Claims. (Cl. 175—183)

This invention relates to apparatus for testing electrical equipment and more particularly to apparatus for testing and measuring, by a comparison method, the conductivity of normally low resistance circuit connections and joints in such electrical equipment as circuit breakers, switches, bus bars and the like that carry heavy currents.

Reliable operation of various types of equipment in a power distribution system can be insured only by periodic inspections or tests and, to reduce the time during which the equipment is withdrawn from service, such inspections or tests should be made in the field and should be completed as rapidly as is possible. The practice has been to judge the condition of bolted connections at bushing joints and bus connections, and of the contacts of circuit breakers and switches by a visual inspection, by the measurement of millivolt drop across joints or contacts, and by the measurement of resistance by the Wheatstone bridge or low resistance reading ohmmeter. The judging or measurement of contact resistance by these methods has proved unsatisfactory for a number of reasons. The milli-volt drop method is unsatisfactory since a poor joint or contact may pass all of the test current through the millivoltmeter, thus destroying the instrument. Both the Wheatstone bridge and low resistance reading ohmmeter may indicate a low resistance when the joint or contact is subjected to a low value test current but, when the joint is subjected to load current, high resistance may develop due to the failure of the joint or contact to sustain rated load.

The visual inspection method is not applicable to some types of connections and involves considerable expense in the case of taped joints and circuit breaker contacts. The inspection of the contacts of oil circuit breakers has been particularly expensive in view of the time and the number of men required to drop the tanks or to drain the oil and open manholes. The cost of a visual inspection of the contacts of a three-phase, 132 kilovolt outdoor circuit breaker is of the order of $120.00, and of a 24 kilovolt circuit breaker about $38.00. Regardless of expense, the visual inspection method is open to the objection that the equipment is out of service for an extended period and, even in an emergency, cannot be returned to service in less than several hours.

An object of the present invention is to provide apparatus of simple construction that can be used in the field by unskilled workmen, and which is not subject to damage from overloads, for testing the conductivity of normally low resistance connections in electrical equipment. An object is to provide apparatus for testing the conductivity of circuit connections by subjecting them to current flow of the order of that normally carried by the circuit connections. An object is to provide portable testing apparatus for supplying a heavy direct current to the connection under test and to a low resistance shunt across that connection, and ammeters for measuring the total current flow and the current through the low resistance shunt. A further object is to provide testing apparatus of the type last stated that includes rectifiers for developing a direct current of the order of upward of 100 amperes from the usual 110 volt, 60 cycles alternating current line.

These and other objects, and advantages, of the invention will be apparent from the following specification when taken with the accompanying drawings, in which:

Fig. 5 is a side elevation, with part of the casing broken away, of the testing apparatus that is shown diagrammatically in Fig. 1;

Figs. 6 and 7 are end and plan views, respectively, of the apparatus, the hinged lid being omitted from Fig. 6;

Fig. 8 is a plan view of a testing unit that includes the circuit elements shown in the Fig. 2 diagram; and Fig. 9 is a side elevation of the same, with parts broken away to show a portion of the rectifier assembly.

Figure 1:
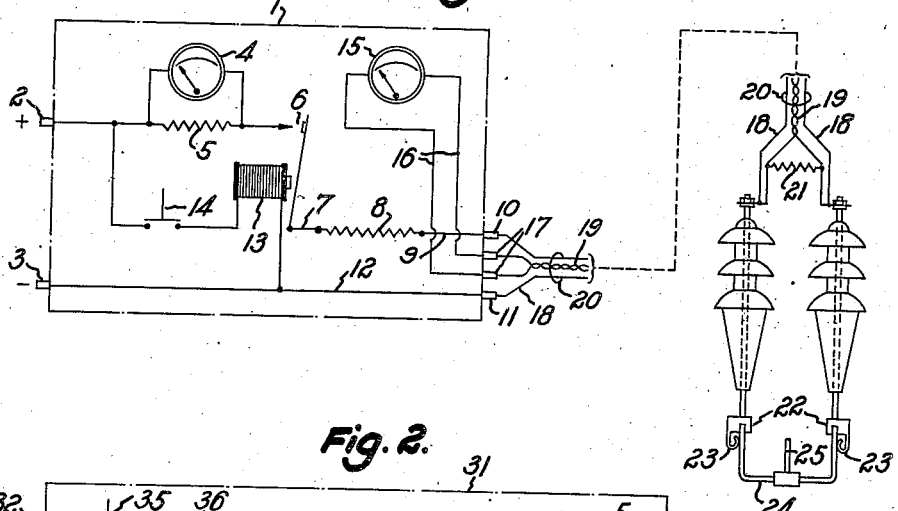
Fig. 1 is a circuit diagram of an embodiment of the invention, connected to a circuit breaker for testing the resistance of the breaker contacts; the apparatus being designed for use where direct current is available.
Figure 2:
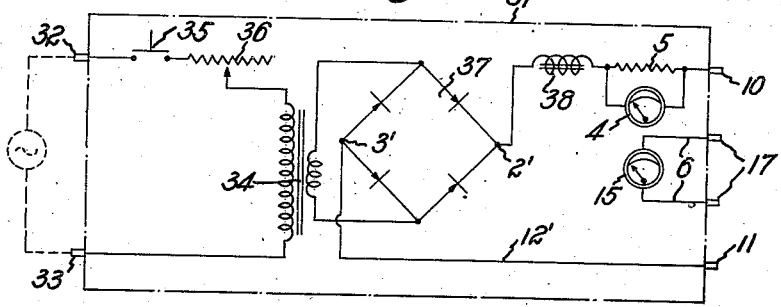
Fig. 2 is a circuit diagram of an embodiment of the invention that includes a step-down transformer and rectifier for developing a direct current from an alternating current source.

As is indicated by the descriptions of Figs. 1 and 2, both forms of the invention are designed to supply a direct current to the joint or switch contacts under test. This is essential since the inductive reactance component of the circuit impedance drops to zero when a direct current is employed, thus making it possible to read accurately the resistance ratio of the instrument and the test circuits. Furthermore, the direct current must be relatively high to avoid false indications of the contact resistance in the case of circuit breakers that have operated a number of times to interrupt heavy short circuits. Such contacts, although so badly eroded as to have a high contact resistance at a normal load current of high magnitude, may have point contacts in good engagement that present a low or normal resistance to a low test current. A test current of the order of 100 amperes or more will melt down small point contacts and thus establish a contact resistance identical with or approximating that which exists when the joint or switch contacts are in service and carrying load currents substantially higher than a 100 to 200 ampere test current.

In Fig. 1, the broken line rectangle I indicates a box or casing that houses the instruments, switches, etc., and has terminals for connection to the current source and to a cable that extends to the test specimen. The input terminals 2, 3 are to be connected to a direct current source of high current capacity such as, for example, the storage batteries usually provided at stations and substations for operating circuit breakers and other protective equipment. Terminal 2 is connected through an ammeter 4 and its instrument shunt 5 to the fixed contact of a magnetic switch 6; the moving contact being connected through lead 7, a current-limiting resistor 8 and lead 9 to an output terminal 10. The other output terminal 11 is directly connected to the input terminal 3 by a strap 12; and the solenoid 13 of the magnetic switch is connected, in series with a push-button switch 14, between the opposite sides of the direct current line.

The ammeter 4 is a small milliammeter for measuring the total current flow through the test unit, the milliammeter and its shunt resistance 5 being so designed that the full scale reading of the instrument corresponds to, for example, 200 amperes through the testing apparatus. A similar milliammeter 15 is mounted on the casing I for measuring that portion of the total test current which flows through a shunt that is connected, as will be described later, across the joints or switch contacts under test. The ammeter 15 is connected by leads 16 to instrument terminals 17 that extend through a wall of the casing I.

The casing I may be placed at a point near the equipment to be tested, and connections are made to the test specimen through heavy flexible conductors 18 and smaller flexible conductors 19 that are bound at intervals by tape or cord 20 to form a cable of desired length, for example about 50 feet. The inner ends of conductors 18 have lugs, not shown, for connection to the current output terminals 10, 11, respectively, and the corresponding ends of the conductors 19 have lugs for engagement with the instrument terminals 17. The outer ends of the instrument leads or conductors 19 are connected to the respective current conductors 18, and the leads are twisted throughout the greater part of the length of the cable to prevent a pick-up from stray magnetic fields produced by adjacent current carrying conductors. The shunt resistance 21 that is connected across the leads 19 adjacent their outer ends is preferably the range-adjusting shunt for the instrument 15 when the value of that resistance is of the same order as the maximum allowable resistance of the joints or contacts to be tested but an additional loading resistor may be connected in series with the instrument shunt 21 when the instrument 15 is of such design that its full scale deflection is obtained with an instrument shunt resistance that is substantially lower than the normal resistances of the joints or contacts to be tested.

As shown in Fig. 1, the test unit is connected through the cable 18, 19 to an oil circuit breaker comprising a pair of main contacts 22 and arcing contacts 23 that are normally connected by a jumper bar 24, the bar 24 being moved downwardly by a rod 25 and mechanism, not shown, to open the circuit for normal switching operations or upon predetermined overload conditions. It is to be understood that the illustration of the circuit breaker is diagrammatic and that the particular design of the equipment that may be tested is not a feature of this invention.

The test unit for use with an alternating current source, as shown in Fig. 2, comprises a casing 31 having input terminals 32, 33 for connection to the usual 110 volt, 60 cycles power line and a step-down transformer 34, the primary of the transformer being connected across the terminals through a push-button switch 35 and an adjusting resistance 36. The transformer secondary is connected to one set of terminals of a copper oxide type of full wave rectifier 37, and the other set of terminals 2', 3' delivers a direct current of the order of 200 amperes to the output terminals 10, 11. A choke 38 for smoothing out the rectified current is connected, in series with the shunt 5 of ammeter 4, between the bridge terminal 2' and output terminal 10, and the bridge terminal 3' is connected to output terminal 11 by a lead 12'. The ammeter 15 is connected through leads 16 to the instrument terminals. The cable as shown in Fig. 1 may be used with the test unit of Fig. 2.

The method of testing the conductivity of the contacts of an oil circuit breaker is as follows. The breaker is removed from service in the usual manner by connecting the load to another section of the distribution system and the cable leads 18 are connected to the breaker terminals in place of the normal circuit connections. The test unit of Fig. 1 is used where direct current is available, the current source being connected to the input terminals 2, 3. The test circuit is completed by depressing push button 14 to energize the solenoid 13 of the magnetic switch, and the readings of the instruments 4 and 15 are recorded.

The total current flow is registered by instrument 4 and the current through the shunt resistance 21 is registered on instrument 15. These values are read both for the normal closed position of the breaker and for the partially open position in which the jumped 24 has left the main contacts 22 and engages only the arcing contacts 23.

Figure 3:
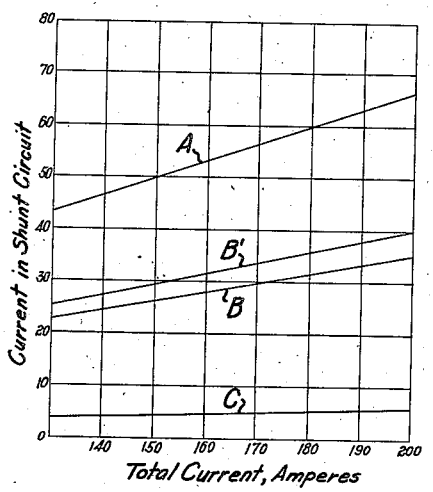
Fig. 3 is a curve sheet showing curves indicating the maximum allowable current through the shunt resistance for different types of circuit breakers at different total currents through the testing apparatus.
Figure 4:
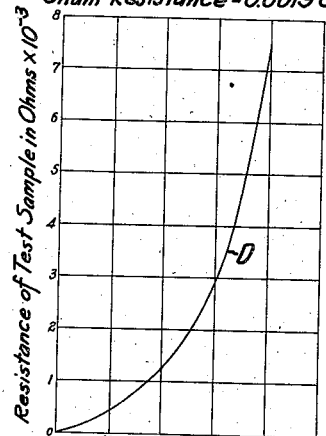
Fig. 4 is a curve sheet showing the relation between the resistance of the test specimen and the current through the shunt resistance for a given value of the shunt resistance and a given total current flow.

The resistance of the circuit breaker, from one outer terminal to the other, may be computed from the two current values and the known value of the resistance 21 that is shunted across the breaker but, for speed and convenience in the field, it is preferable to judge the condition of circuit breakers by referring to measured current values to previously prepared curve sheets such as shown in Figs. 3 and 4. Each of the curves of Fig. 3 indicates, for a particular type of circuit breaker, the maximum current flow in the shunt resistance 21, for different values of total current flow, that corresponds to a satisfactory condition of the contacts and other electrical joints of that circuit breaker. Each of the curves was obtained by checking the conductivity measurements on a large number of circuit breakers of a given type by inspections of the contacts and any bolted connections between the outer terminals and the contacts.

Curve A was plotted from tests on a particular type of 132 and 154 kilovolt circuit breaker, curves B and B' were plotted for the main and arcing contacts of another type of breaker, and curve C was plotted for the main contacts of a 3000 ampere circuit breaker. All of the curves are based upon the same value, specifically 0.0019 ohm, for the resistance 21 that is shunted across the circuit breaker. The wide variation in the maximum shunt current reading that corresponds to a satisfactory condition of breakers of different types, or of different contacts of a breaker of a given type, is explained by differences in the length and the cross-section of the conducting path through the circuit breakers.

Further inspection is of course necessary when the measured value of the current flow through the shunt resistance 21 is greater than the maximum allowance indicated by the Fig. 3 curve for that type of breaker. Various causes for an unduly high resistance have been found during the use of this testing apparatus and, in many instances, the particular defects that were responsible for the high resistance would not have been located by the prior method of visual inspection. The most common causes of high resistance are burnt, pitted or defective circuit-breaker contacts resulting from the breaker opening under heavy overloads or from loose connections, but it has been found that poorly assembled terminal bushings are also responsible for some high resistance joints.

The total current flow may be set to exactly 200 amperes or any other selected value when the Fig. 2 circuit is used as the low voltage direct current may be regulated by the small adjustable resistance 36 in the transformer primary circuit. It is not convenient to adjust the main line current to a particular value when the Fig. 1 circuit is used, but adjustment to a particular value is not essential as the Fig. 3 curve sheet shows permissible maximum values of shunt current for a wide range of total current values.

The curve D of Fig. 4 shows the relation between the resistance of the circuit breaker and current flow in the shunt resistance for a particular value of the shunt resistance and a predetermined total current flow. These predetermined values for curve D were a shunt resistance of 0.0019 ohm and a total current of 200 amperes. The curves of Fig. 3 were plotted for the same shunt resistance and therefore the maximum allowable resistance of the circuit breakers can be determined from the curve sheets. The magnitude of the resistance values to be measured is indicated by curve D which shows that the maximum allowable resistance for the 132 and 154 kilovolt circuit breakers, curve A of Fig. 3, is about .001 ohm. The maximum allowable resistance for other types of circuit breakers is substantially lower and, in general, the measured resistances will be far below the maximum allowable values indicated by the curves of Fig. 3.

The instruments 4 and 15 are preferably identical and have identical range-adjusting shunts 5 and 21, respectively, thus eliminating the possibility of overloading the instruments during tests and facilitating periodic tests of the condition of the instruments and cable connections. A fair test of the condition of the instruments may be had at the start of each test by noting that the instruments 4 and 15 indicate the same current flow before the conductors 18 are connected to the test specimen since it is not probable that both instruments will simultaneously develop errors of the same magnitude. The condition of the cable connections and the accuracy of the instrument 15 may be checked from time to time by connecting a known resistance and a check ammeter between the outer ends of conductors 18. The check ammeter and instrument 15 should indicate the same current value when, as is preferable, the known resistance has the same value as resistance 21. After checking the instrument 15, the instrument 4 may be checked by removing the known resistance, thus establishing the same current flow through the instrument shunts 5 and 21.

The conductivity testing apparatus of Fig. 1 may be assembled in a small portable unit such as shown in Figs. 5, 6 and 7. The top wall 40 of the casing 1 may be a panel of wood or other insulating material on which the ammeters 4 and 15, and the push button switch are mounted, and the side walls may be perforated plates 41 that are attached to the metal frame 42 of the box. The perforated plates afford adequate air cooling for the current-limiting resistor 8 that is supported from the top wall 40 by brackets 43. All of the terminals are mounted on one end wall of the box, and the instruments are mounted on the top wall at the end above the terminals. The leads from instrument 4 to its shunt 5 are preferably quite long for convenience of assembly and the extra length of the leads is held in fixed position with respect to the other circuit elements by housing it in a tube 44 that is fixed to the bottom wall. A narrow lid 45 for protecting the instruments is hinged to one end of the box, and a leather carrying strap 46 has slotted ends for attachment to headed studs 47 on the opposite ends of the box.

A physical embodiment of the Fig. 2 testing circuit, as shown in Figs. 8 and 9, comprises a metal casing 31' that houses all of the circuit elements, has parts of hinges 49 at its upper edge for the attachment of a cover 50, and is provided with a carrying strap 51. The rectifier bridge consists of a large number of copper oxide rectifier assemblies 37' of conventional design that are mounted on angle bars 52 by bolts 53. The rectifier assemblies are close to the walls of the casing 31', and the transformer 34 and reactor 38 are centrally located within the casing. The transformer 34 is arranged above the reactor to shield the instruments 4 and 15 from the reactor, and a sheet 54 of insulating material is placed between these elements. The input terminals 32, 33 may conveniently take the form of a "Hubbell" socket on the top wall of the casing 31', and the terminals 10', 11' and 17' of the power and instrument circuits, respectively, may be mounted on a strip 55 of insulating material that is secured to the top wall. The push button switch 14 and the knob 36' for adjusting the resistance 36 are arranged at opposite sides of the instruments 4 and 15.

The described constructions are practical and convenient for field use but it is obvious that other arrangements of the essential elements of the conductivity testing circuits may be used.

Ammeters of the type that carry the entire current flow could be employed but, in view of the heavy current, it is less expensive and more convenient to employ small milliammeters with resistance shunts.

I claim:

1. Apparatus for measuring the conductivity of normally low resistance electrical connections that carry heavy currents in an electrical distribution system, said apparatus comprising input terminals for connection to a current source, output terminals connected to said input terminals through a normally open switch and a current-measuring instrument, flexible conductors for connecting said output terminals to the electrical connection to be tested, a resistance connected between the ends of said conductors that are to be connected to the electrical connection to be tested, an instrument for measuring the current flow through said resistance, and instrument leads connecting said second instrument to said resistance.

2. A portable apparatus for measuring the conductivity of normally low resistance electrical elements in an electrical distribution system, said apparatus comprising a casing, a pair of current measuring instruments carried by said casing, input terminals on said casing for connection to a current source, output terminals on said casing, flexible conductors for connecting said output terminals to the electrical element to be tested, connections between said input and output terminals including circuit elements connected to one of said instruments to condition the same to register the total current flow from said current source, a resistance connected between said conductors and thereby shunted across the electrical element to be tested, and instrument leads connecting the second instrument to said resistance to condition that instrument to register the current flow through said resistance.

3. A portable apparatus as claimed in claim 2, wherein said resistance is connected between said conductors adjacent the ends thereof that are to be connected to the electrical element to be tested.

4. A portable apparatus as claimed in claim 2, wherein said resistance is connected between said conductors adjacent the ends thereof that are to be connected to the electrical element to be tested, and said instrument leads are twisted upon each other and secured to said flexible conductors to form a cable.

5. In a portable apparatus for measuring the conductivity of normally low resistance elements in an electrical distribution system, the combination with a casing carrying a pair of milliammeters, input terminals for connection to a direct current source of high current capacity, output terminals, connections including an instrument shunt resistance between said input and output terminals, connections between one of said milliammeters and said resistance to condition that instrument to indicate the total current flow through said apparatus, instrument terminals on said casing and connected to the second milliammeter, of a cable comprising conductors for connecting said output terminals to the electrical element to be tested, a resistance connected between the ends of said conductors that are to be connected to the electrical element, and instrument leads extending from said instrument terminals to said second resistance to condition the second milliammeter to indicate the current flow through said second resistance, whereby the conductivity of the electrical element may be determined from a comparison of the readings of the two milliammeters.

6. In a portable apparatus, the invention as claimed in claim 5, wherein said second resistance is a range-adjusting shunt which conditions said second milliammeter for measurements in the same current range as that of the first milliammeter.

7. In apparatus for measuring the conductivity of an electrical element of a distribution system, a casing carrying a pair of current measuring instruments, input terminals on said casing for connection to an alternating current source, a transformer having a primary winding for connection between said input terminals and a secondary winding, rectifier means connected across said secondary winding and having terminals across which a direct current of a high order is developed, output terminals on said casing, circuit elements connecting said rectifier means terminals to said output terminals, said circuit elements including means for connecting one of said currents measuring instruments in circuit to indicate the total current output of said rectifier means, conductors for connecting said output terminals to the electrical element to be tested, a resistance connected between the ends of said conductors that are to be connected to the electrical element, and means comprising said second current measuring instrument and leads connecting the same to said resistance for indicating the current flow through said resistance, whereby the conductivity of the electrical element may be determined from a comparison of the readings of said instruments.

8. In apparatus for measuring conductivity, the invention as claimed in claim 7, in combination with means in circuit with the primary winding of said transformer for adjusting the total current flow through said apparatus to a predetermined value.

9. The method of determining the conductivity of an oil circuit breaker which comprises shunting the circuit breaker by a resistance of the order of the normal resistance of the circuit breaker, passing through said circuit breaker and shunt resistance a direct current of the order of upward of 100 amperes, measuring the total current flow and the current flow through said shunt resistance, and determining the conductivity of the circuit breaker by a comparison of the two measured current values.

GEORGE A. MATTHEWS.